United States Patent [19]

Wallin

[11] 4,044,969
[45] Aug. 30, 1977

[54] LOCKING MECHANISM FOR VEHICLE SAFETY BELTS

[75] Inventor: Jan-Olof Wallin, Mariefred, Sweden

[73] Assignee: Granges Essem Aktiebolag, Vasteras, Sweden

[21] Appl. No.: 643,117

[22] Filed: Dec. 22, 1975

[30] Foreign Application Priority Data

Dec. 23, 1974 Sweden .................... 7416264

[51] Int. Cl.² .................. A62B 35/02; B65H 75/48
[52] U.S. Cl. .................... 242/107.4 A; 188/82.77; 188/184; 242/107.4 B
[58] Field of Search ............. 242/107.4 R, 107.4 E, 242/107.3, 107.6, 107.7; 74/577; 188/82.77, 136, 139, 184; 280/744–747

[56] References Cited

U.S. PATENT DOCUMENTS

| | | | |
|---|---|---|---|
| 3,206,137 | 9/1965 | Snyderman | 242/107.4 B |
| 3,397,849 | 8/1968 | Hansen | 242/107.4 B |
| 3,905,562 | 9/1975 | Kell | 242/107.4 A |
| 3,921,930 | 11/1975 | Fohl | 242/107.4 A X |
| 3,929,300 | 12/1975 | Lindquist | 242/107.4 B |

Primary Examiner—Stanley N. Gilreath
Assistant Examiner—John M. Jillions
Attorney, Agent, or Firm—Browdy and Neimark

[57] ABSTRACT

A locking mechanism for vehicle safety belts of the type in which a strap of the belt is automatically retracted into a housing and coiled up on a reel when the belt is not in use, to lock the reel either at rapid extraction of the strap of the belt or at an alteration in the travelling speed or direction of the vehicle. The locking mechanism comprises at lease two latching means which are attached to the reel and arranged to rotate with it and which are mounted so that they can be displaced from a retracted position, in which they do not hinder the rotation of the reel, to an extended position, in which they are in engagement with a stop for locking the reel. The latching means are arranged to be moved out by rapid rotation of the reel due to rapid extraction of the strap of the belt or by an actuating means which is rotatably mounted on the reel and arranged to engage with the latching means. The actuating means is arranged to be driven by said latching means when the spindle is rotated and to be braked in relation to the reel in case of an alteration of movement speed or direction of the vehicle. When braked, the actuating means drives said latching means so that they substantially simultaneously are moved out to the latching position for locking the reel.

4 Claims, 3 Drawing Figures

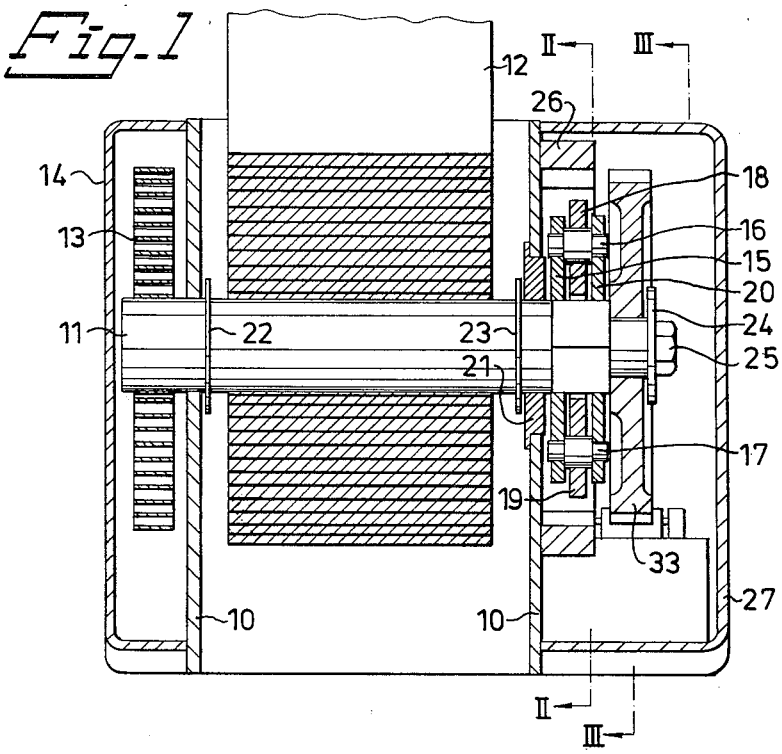
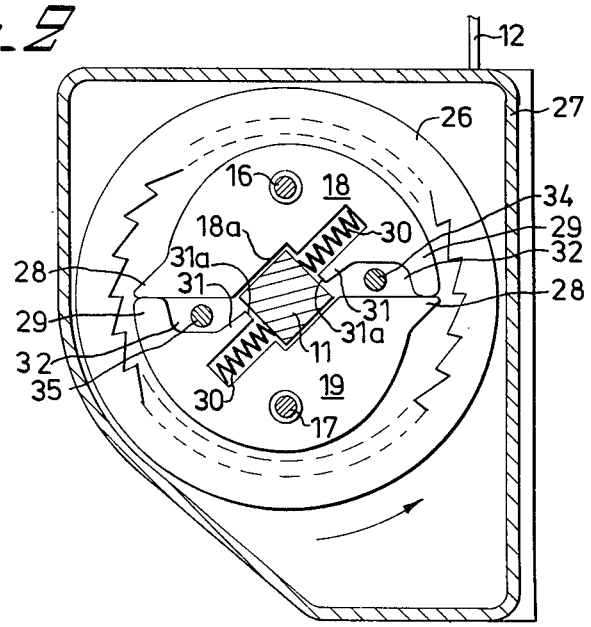

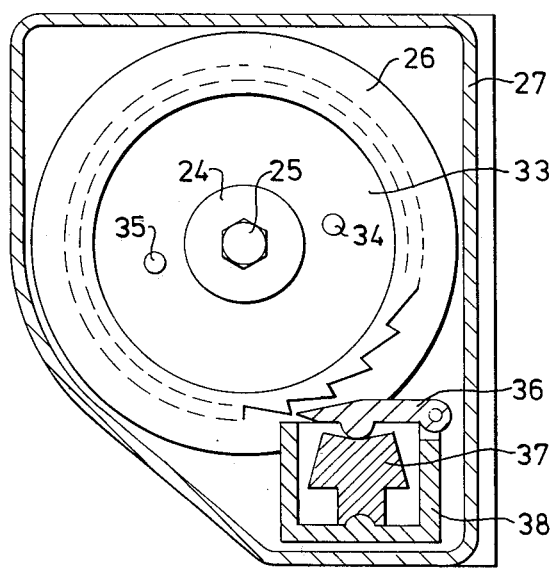

LOCKING MECHANISM FOR VEHICLE SAFETY BELTS

The present invention relates to a locking mechanism for safety belts, intended for use in motor vehicles, of the type in which a strap in the belt is automatically drawn into a housing and coiled up on a reel when the belt is not in use, to lock the reel either at rapid extraction of the strap of the belt or at an alteration in the travelling speed or direction of the vehicle.

It is previously known to provide safety belts of the type set forth above with devices which lock the reel when the strap of the belt is rapidly extracted. It is further previously known to provide such safety belts with devices which lock the reel in response to an alteration in the vehicle movement. It is, however, desirable to provide a locking mechanism which locks the reel both at rapid extraction of the strap of the belt and at an alteration in the speed or direction of movement of the vehicle, since this gives increased safety. The problem is here that such a mechanism having the combined functions will be bulky, and thereby difficult to locate, especially in certain cars where the space at the place for attaching the safety belt is very limited.

The main object of the present invention is therefore to provide a locking mechanism with small dimensions which provides locking of the reel both at rapid extraction of the belt and at alterations in the speed or direction of movement.

An embodiment of the invention will now be described in detail while referring to the attached drawings.

FIG. 1 shows in cross-section a reeling means for a safety belt, in which the locking mechanism according to the invenion is used.

FIG. 2 shows a sectional side elevation of the locking mechanism along the line II—II in FIG. 1.

FIG. 3 shows a sectional side elevation of the locking mechanism along the line III—III in FIG. 1.

The reeling device shown in FIG. 1 comprises a reel or spindle 11 rotatably mounted in a housing 10, there being a strap 12 as part of the safety belt or harness which can be reeled onto the spindle. At its lefthand end in the figure the spindle is connected to the inner end of a helical spring 13, the outer end (not shown) being firmly attached to a cover 14 fastened to the housing 10. The spring 13 is adapted for tensioning when the spindle rotates as the strap 12 is pulled out, and for causing the spindle to rotate in the opposite direction when tension in the strap ceases, so that the strap is automatically rewound on the spindle when the belt is not used, and is always kept tensioned when a person is using the belt. At its righthand end in the figure the spindle is provided with a locking mechanism which is arranged to provide locking of the spindle at rapid extraction of the strap, e.g. as a person using the belt is thrown forward, but to allow slow extraction of the strap, e.g. if the person using it leans slowly forward. The locking mechanism comprises a carrying plate 15 which is non-rotatably attached to the spindle 11 and arranged to accompany the spindle when it rotates.

The carrying plate 15 is arranged in a plane at right angles to the spindle and is provided with two projecting pins 16, 17 which are parallel with the spindle and on which two pawls 18, 19 are pivotally mounted. Each pin thus carries its own pawl, as is more clearly shown in FIG. 2. On the spindle 11 there is further arranged a supporting plate 20 parallel to the carrying plate 15 and at a distance from it, the pawls 18, 19 being located between the two plates 15, 20. The pins 16, 17 project with their outer ends into holes in the supporting plate 20 so that the supporting plate 20 contributes to a stable and positive attachment of the pins.

At its righthand end in FIG. 1, the spindle 11 is journalled in a bearing 21 and the spindle is prevented from axial displacement by two locking discs 22, 23, both placed inside the housing immediately adjacent the walls thereof. The portion of the spindle carrying the locking mechanism itself has a square cross-section, as is shown in FIG. 2. A wheel 33, described below, is arranged outside the plate 20. The means comprising the locking mechanism are kept on the spindle by means of a stop washer 24 and a locking screw 25.

A ring gear 26 is attached to the housing 10, coaxially with the spindle 11, and has inwardly directed teeth, the distance of which to the centreline of the spindle being so adjusted that the pawls in the retracted position, the free position, do not come into contact with the teeth and in the extended position, the latching position, come into engagement with the teeth. The location of the ring gear 26 in relation to the spindle and the pawls is shown more clearly in FIG. 2. The means 15-20, 24-25, incorporated in the locking mechanism and arranged outside the housing 10, are enclosed by a cover 27 attached to the housing.

As may be seen from FIG. 2, the pins 16, 17 are symmetrically located diametrically in relation to the spindle 11 and at a relatively large distance from each other. The pawls abut each other, and the line of contact in the free position of the pawls is substantially at a right angle to the line connecting the pins 16, 17 and passes through the centre of the spindle.

The pawls 18, 19 are arcuate and at one end provided with a projecting engaging tip 28, the other end being provided with a supporting tail 29. The pawls are identically alike, and the tip 28 is arranged at the foward end, in relation to the rotation of the spindle when the belt is being pulled out. This rotational direction is indicated with an arrow in FIG. 2.

Each pawl is provided with a compression spring 30, which is compressed between the spindle and the rear portion of the pawl, so that the pawls are normally kept in a retracted position, in which they with stop surfaces 18a abut against the spindle. The rear portion of each pawl is further provided with a projection 31 extending towards the spindle. This projection has a flat contact surface 31a, which in the free position of the pawl is at a distance from the spindle, and in the latching position of the pawl is in contact with the spindle for limiting the extension of the pawl, for reasons which will be more closely described below.

The rear portion of the pawls is provided with a cutaway portion or notch 32, which gives the forward portion of the pawls a greater mass than the rear portion, so that the extension of the pawls on rapid rotation of the spindle can take place through the action of centrifugal force.

This part of the locking mechanism functions in the following manner. When the spindle rotates slowly, the pawls are kept in a retracted position, i.e. the free position, by the effect of the springs 30, which allow the spindle to continue to rotate so that the belt can be pulled out. When the spindle rotates rapidly due to the fact that a person using the belt is being thrown forward, i.e. when the vehicle is sharply braked, the pawls are pivoted outwardly against the bias of the springs 30, so that the engaging tips of the pawls are displaced outwardly into engagement with the surrounding ring gear. As the pawls are in engagement with each other they will be pivoted outwardly simultaneously, since the rear end of the one pawl forces the forward end of the other pawl outwardly, even if some differences should exist between the pawls due to manufacturing tolerances. As a very small gap between the pawls is sufficient for the necessary turning of the pawls to take place, the accuracy in the movement of the pawls will be very great, which means that the engaging tips of the pawls can come into engagement with the ring gear substantially. If the stop projection 31 does not exist, or does not come into contact with the spindle, the pawls will be turned until they bottom in the space between two teeth in the ring gear. If the pawls do not bottom simultaneously, one of them will engage earlier than the other, giving rise to severe stresses. If the pawls are to bottom simultaneously, it will be necessary to manufacture the ring gear with very high precision, and above all to exactly center the ring gear on the spindle. These conditions are difficult and expensive to meet, and to avoid them, the stop projection 31 is arranged to stop the extension of the pawl just before it bottoms in the ring gear. The tips of the pawls will then stop the roller by engaging with the substantially radially directed surfaces on the teeth. The demand for precision in manufacturing the ring gear and in exact aligning it to the spindle is thereby reduced. Since the pawls 31 are brought into engagement with the spindle, and especially with a flat surface on the spindle, the maximum extension of the pawls can be determined with good accuracy, at the same time as the supporting tails of the pawls are relieved from compressive stresses.

The wheel 33 arranged outside the plate 20 is rotatably mounted on the spindle 11 and can thus be rotated in relation to the spindle. The wheel is provided with teeth at its circumference, as is more clearly shown in FIG. 3, and with two pins 34, 35 projecting through the plate 20 and between the pawls, as shown in FIG. 2. The pins 34, 35 are parallel with the spindle 11 and project into the notches 32 on the pawls. The plate 20 is provided with openings or slots (not shown) which are substantially larger than the cross section of the pins, so that the wheel 33 can be turned or rotated to some extent on the spindle 11.

At the circumference of the wheel 33 a pivotably mounted pawl 36 is arranged. This pawl can be pivoted to engagement with the teeth on the wheel 33, thus preventing the wheel rotation. The pawl 36 is moved into engagement in response to movement by a tiltable inertia means 37, the shape and function of which are more closely described in the British Patent Specification 1,351,642. The inertia means 37, which is on the bottom surface of a cup 38, is actuated by the movement of the vehicle to provide locking of the wheel 33 at an alteration of the speed or direction of the vehicle.

In the locking mechanism, the wheel 33 functions in the following manner. When the pawl 36 engages with the teeth of the wheel 33, the wheel is prevented from rotating, and when the strap 12 is extracted or pulled out, the spindle is turned in relation to the wheel. The pawls 18, 19 thereby come into contact with the pins 34, 35 projecting from the wheel, which prevent the continued rotation of the pawls with the spindle. The pawls will then be pivoted or turned about their pivot pins 16, 17 into engagement with the ring gear 26 as described above. In this case, the spindle is locked even if extraction of the strap takes place slowly. If the wheel 33 is not locked, it is driven by the pawls when the spindle rotates, so that extraction of the strap in the belt can take place.

Even if only one embodiment has been shown and described, it is obvious that a plurality of modifications and embodiments are possible within the scope of the invention. The pawls can have another geometric form, e.g. triangular, and the spring for returning the pawls or locking means can have another shape or location. The ring gear can be replaced by other fixed locking surfaces or possibly by a friction surface. The notch in the rear portion of each pawl can further consist of one or more holes with different locations, or be substituted by heavy elements which are placed on or in the forward portion of the pawls, so that the necessary difference in mass between the forward and the rear portion, required for the action of centrifugal force, is obtained. More than two pawls can be used, whereby the pawls commonly act on each other in such a way that they are extended to the locking position simultaneously. The pawls may also be made displaceable instead of pivotable.

The wheel 33 can alternatively be actuated by friction means for achieving braking and locking, or braking can be achieved by a pendulum or by electrical means, e.g. with a solenoid. The pins on the wheel can alternatively also engage in slots in the pawls.

What is claimed is:

1. A locking mechanism for a retractable safety belt having a strap in a vehicle to lock the belt either at rapid retraction of the strap of the belt or at an alteration in travelling speed or direction of the vehicle, the mechanism comprising, in combination, a reel having an axis and on which the strap is coiled up when not in use; a supporting means attached to said reel for rotation with it; two pivot pins attached to said supporting means and positioned diametrically and at equal distances from and in parallel to said reel; at least two latching means pivotally mounted on said two respective pivot pins thereby to be turnable by centrifugal force from a retracted free position to an extended, latching position, said at least two latching means having substantially identical shapes, having respective notches and being positioned in a given plane perpendicular to said reel to abut one another in said plane whereby an angular turning of one of said at least two latching means causes a corresponding equal angular turning of the other of said at least two latching means; an actuating means rotatably mounted on said reel and provided with respective pins projecting into said respective notches in said at least two latching means so as to be driven by said at least two latching means upon rotation of said reel; and a movable inertia member for braking said actuating means in relation to said reel in response to an alteration of speed or direction of the vehicle, said actuating means when braked forcing said at least two latching means substantially simultaneously to the latching positions for locking said reel.

2. A locking mechanism as claimed in claim 1, wherein said actuating means comprises a wheel having a circumference, and wherein said movable inertia member for braking is positioned adjacent said circumference of said wheel for engagement with said wheel in response to an alteration of speed or direction of movement of the vehicle.

3. A locking mechanism as claimed in claim 2, wherein said wheel is provided with teeth along its circumference and said braking member comprises a pawl which is pivotable into engagement with said teeth.

4. A locking mechanism as claimed in claim 3, wherein said pawl is coupled and controlled by said inertia member, said inertia member comprising a tiltable inertia member, said inertia member on alteration of speed or direction of the vehicle tilting into a position in which it moves said pawl into engagement with said teeth of said wheel.

* * * * *